United States Patent
De Lagrange et al.

(10) Patent No.: US 11,936,868 B2
(45) Date of Patent: Mar. 19, 2024

(54) QUANTIZATION FOR VIDEO ENCODING OR DECODING BASED ON THE SURFACE OF A BLOCK

(71) Applicant: InterDigital VC Holdings, Inc., Wilmington, DE (US)

(72) Inventors: Philippe De Lagrange, Betton (FR); Philippe Bordes, Laille (FR); Edouard Francois, Bourg des Comptes (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 17/287,740

(22) PCT Filed: Oct. 21, 2019

(86) PCT No.: PCT/US2019/057149
§ 371 (c)(1),
(2) Date: Apr. 22, 2021

(87) PCT Pub. No.: WO2020/096755
PCT Pub. Date: May 14, 2020

(65) Prior Publication Data
US 2021/0400275 A1    Dec. 23, 2021

(30) Foreign Application Priority Data

Nov. 8, 2018 (EP) .................. 18306469
Dec. 21, 2018 (EP) .................. 18306824

(51) Int. Cl.
*H04N 19/124* (2014.01)
*H04N 19/176* (2014.01)
*H04N 19/186* (2014.01)

(52) U.S. Cl.
CPC ......... *H04N 19/124* (2014.11); *H04N 19/176* (2014.11); *H04N 19/186* (2014.11)

(58) Field of Classification Search
None
See application file for complete search history.

(56) References Cited

U.S. PATENT DOCUMENTS 3,840,821 A * 10/1974 Conway .................. H03L 7/085
                                                                   331/25
5,194,950 A * 3/1993 Murakami ............ H04N 19/50
                                                        375/E7.277

(Continued)

FOREIGN PATENT DOCUMENTS

CN       108702507 A     10/2018
EP        2773117 A1      9/2014

(Continued)

OTHER PUBLICATIONS

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

(Continued)

*Primary Examiner* — Mohammad J Rahman
(74) *Attorney, Agent, or Firm* — CONDO ROCCIA KOPTIW LLP

(57) ABSTRACT

An image is split into a plurality of blocks of various sizes and a subdivision level counter is associated to each of the blocks. The value of this subdivision level counter for a block is representative of the size of the block and is used to determine the quantization parameter for the block. The value is propagated for each subdivision and incremented according the type of the subdivision. When the image is split, an analysis is done according to the subdivision level counter, a maximal value of subdivision and the type of split, in order to determine the start of a new quantization group (Continued)

and when it is the case, the current position of the partition is propagated to the further split partitions to be stored with these partition and serve in the prediction process when decoding.

20 Claims, 20 Drawing Sheets

(56) References Cited

U.S. PATENT DOCUMENTS

| | | | | |
|---|---|---|---|---|
| 5,287,200 | A * | 2/1994 | Sullivan | H04N 19/124 |
| | | | | 382/238 |
| 5,828,784 | A * | 10/1998 | Miyashita | G06T 9/40 |
| | | | | 375/E7.266 |
| 6,879,632 | B1 * | 4/2005 | Yokoyama | H04N 19/177 |
| | | | | 375/E7.176 |
| 2002/0102027 | A1 * | 8/2002 | Miyake | H04N 19/124 |
| | | | | 375/E7.231 |
| 2006/0203905 | A1 * | 9/2006 | Hsia | H04N 19/433 |
| | | | | 375/E7.102 |
| 2009/0012784 | A1 * | 1/2009 | Murgia | G10L 19/173 |
| | | | | 704/230 |
| 2011/0116550 | A1 * | 5/2011 | Lee | H04N 19/44 |
| | | | | 375/240.25 |
| 2014/0079117 | A1 | 3/2014 | Yang et al. | |
| 2014/0079135 | A1 | 3/2014 | Van Der Auwera et al. | |
| 2016/0261862 | A1 | 9/2016 | Zhao et al. | |
| 2016/0286232 | A1 * | 9/2016 | Li | H04N 19/52 |
| 2016/0309177 | A1 * | 10/2016 | Laroche | H04N 19/159 |
| 2016/0316214 | A1 * | 10/2016 | Gisquet | H04N 19/124 |
| 2017/0310977 | A1 * | 10/2017 | Laroche | H04N 19/176 |
| 2018/0020215 | A1 * | 1/2018 | Ramamurthy | H04N 19/124 |
| 2018/0020241 | A1 * | 1/2018 | Li | H04N 19/18 |
| 2018/0041762 | A1 * | 2/2018 | Ikai | H04N 19/597 |
| 2018/0192076 | A1 | 7/2018 | Ikai et al. | |
| 2018/0199072 | A1 * | 7/2018 | Li | H04N 19/186 |
| 2019/0191168 | A1 * | 6/2019 | Kuusela | H04N 19/82 |
| 2019/0215516 | A1 * | 7/2019 | Lim | H04N 19/90 |
| 2019/0273923 | A1 * | 9/2019 | Huang | H04N 19/174 |
| 2019/0306536 | A1 * | 10/2019 | Lim | H04N 19/149 |
| 2019/0364279 | A1 * | 11/2019 | Yasugi | H04N 19/119 |
| 2020/0213590 | A1 * | 7/2020 | Kim | H04N 19/167 |
| 2020/0296366 | A1 | 9/2020 | Chono | |
| 2020/0322406 | A1 * | 10/2020 | Deshpande | H04N 19/46 |
| 2020/0322602 | A1 | 10/2020 | Huang et al. | |
| 2020/0329251 | A1 | 10/2020 | Yang et al. | |
| 2021/0037259 | A1 * | 2/2021 | Ko | H04N 19/157 |
| 2021/0092372 | A1 * | 3/2021 | Misra | H04N 19/70 |
| 2021/0195215 | A1 * | 6/2021 | Sjöberg | H04N 19/124 |
| 2021/0337202 | A1 * | 10/2021 | Xiu | H04N 19/186 |
| 2021/0368172 | A1 * | 11/2021 | Lim | H04N 19/1883 |

FOREIGN PATENT DOCUMENTS

| | | |
|---|---|---|
| KR | 10-2018-0081479 A | 7/2018 |
| TW | 201804797 A | 2/2018 |
| WO | WO 2017093189 A1 | 6/2017 |
| WO | 2019135601 A1 | 7/2019 |

OTHER PUBLICATIONS

De Lagrange et al, "CE7-related: Quantization Group size uniformity", Joint Video Experts Team (JVET) of ITU-T SG 16 WP 3 and ISO/IEC JTC 1/SC 29/WG 11, Document: JVET-M0113, 13th Meeting: Marrakech, Morocco, Jan. 9, 2019, 10 pages.

De Lagrange et al, "CE7-related: Quantization Group size uniformity", Joint Video Experts Team (JVET) of ITU-T SG 16 WP 3 and ISO/IEC JTC 1/SC 29/WG 11, Document: JVET-M0113-v2, 13th Meeting: Marrakech, Morocco, Jan. 9, 2019, 10 pages.

De Lagrange et al, "CE7-related: Quantization Group size uniformity", Technicolor, JVET-M0113, Dec. 30, 2018, 10 pages.

Zhao et al, "Quantization parameter signaling", Joint Video Experts Team (JVET) of ITU-T SG 16 WP3 and ISO/IEC JTC 1/SC 29/WG 11, Document: JVET-L0362-v3, 12th Meeting, Macao, China, Oct. 3, 2018, 11 pages.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, 634 pages.

Anonymous, "Information Technology—Generic coding of moving pictures and associated audio information: Systems", International Telecommunication Union, ITU-T Telecommunication Standardization Sector of ITU, Series H: Audiovisual and Multimedia Systems, Infrastructure of audiovisual services—Transmission multiplexing and synchronization, Recommendation ITU-T H.222.0, Jun. 2012, 228 pages.

Bross et al, Versatile Video Coding (Draft 2), Joint Video Experts Team (JVET) of ITU-T SG 16 WP 3 and ISO/IEC JTC 1/SC 29/WG 11, Document: JVET-K1001-v1, 11th Meeting: Ljubljana, Slovenia, Jul. 10, 2018, 41 pages.

Bross, et al., Joint Video Experts Team (JVET), "Versatile Video Coding (Draft 3)", Maco, China, Oct. 3-12, 2018, 161 pages.

Joshi, et al., Joint Collaborative Team on Video Coding (JCT-VC), "High Efficiency Video Coding (HEVC) Screen Content Coding: Draft 6", San Diego, California, Feb. 19-26, 2016, 673 pages.

* cited by examiner

Q-split

B-split

T-split

1/4 AB-split

Further 1/3 AB-split

T-split

1/4 AB-split

1/3 AB-split

First AB-split

Second AB-split

T-split

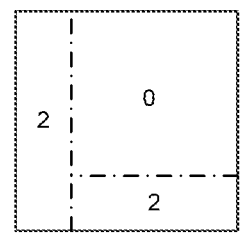
Perpendicular
1/4 AB-splits
Figure 17
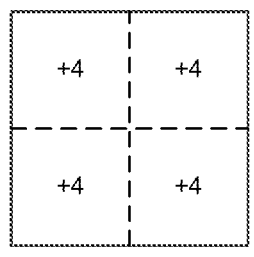 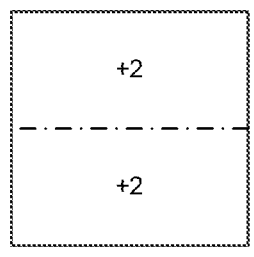 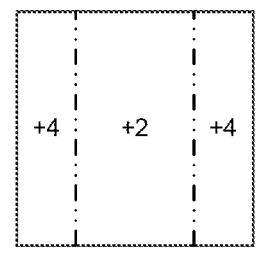
Q-split · · · · · · · · · · · · · B-split · · · · · · · · · · · · · T-split
Figure 18A · · · · · · Figure 18B · · · · · · Figure 18C
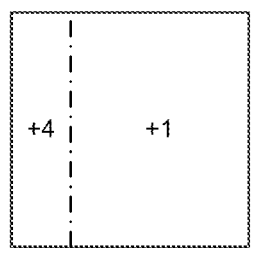 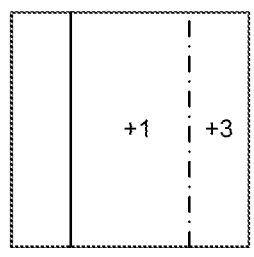
1/4 AB-split · · · · · · · 1/3 AB-split
Figure 18D · · · · · · Figure 18E

| pic_parameter_set_rbsp( ) { | Descriptor |
|---|---|
| [...] | |
| cu_qp_delta_enabled_flag | u(1) |
| if( cu_qp_delta_enabled_flag ) | |
|    cu_qp_delta_subdiv | ue(v) |
| } | |

Figure 24

| coding_tree_unit( ) { | Descriptor |
|---|---|
| [...] | |
| if( slice_type == I && qtbtt_dual_tree_intra_flag ) { | |
|    dual_tree_implicit_qt_split ( xCtb, yCtb, CtbLog2SizeY, 0, 0 ) | |
| else | |
|    coding_quadtree( xCtb, yCtb, CtbLog2SizeY, 0, 0, SINGLE_TREE ) | |
| } | |

Figure 25

| dual_tree_implicit_qt_split( x0, y0, log2CbSize, cqtDepth, cbSubdiv ) { | Descriptor |
|---|---|
|   if( cu_qp_delta_enabled_flag && cbSubdiv <= cu_qp_delta_subdiv ) { | |
|     IsCuQpDeltaCoded = 0 | |
|     CuQpDeltaVal = 0 | |
|     xQg = x0 | |
|     yQg = y0 | |
|   } | |
|   if( log2CbSize > 6 ) { | |
|     x1 = x0 + ( 1 << ( log2CbSize − 1 ) ) | |
|     y1 = y0 + ( 1 << ( log2CbSize − 1 ) ) | |
|     dual_tree_implicit_qt_split( x0, y0, log2CbSize − 1, cqtDepth + 1, cbSubdiv + 2 ) | |
|     if( x1 < pic_width_in_luma_samples ) | |
|       dual_tree_implicit_qt_split( x1, y0, log2CbSize − 1, cqtDepth + 1, cbSubdiv + 2 ) | |
|     if( y1 < pic_height_in_luma_samples ) | |
|       dual_tree_implicit_qt_split( x0, y1, log2CbSize − 1, cqtDepth + 1, cbSubdiv + 2 ) | |
|     if( x1 < pic_width_in_luma_samples && y1 < pic_height_in_luma_samples ) | |
|       dual_tree_implicit_qt_split( x1, y1, log2CbSize − 1, cqtDepth + 1, cbSubdiv + 2 ) | |
|   } else { | |
|     coding_quadtree( x0, y0, log2CbSize, cqtDepth, cbSubdiv, DUAL_TREE_LUMA ) | |
|     coding_quadtree( x0, y0, log2CbSize, cqtDepth, cbSubdiv, DUAL_TREE_CHROMA ) | |
|   } | |
| } | |

Figure 26

| | Descriptor |
|---|---|
| coding_quadtree( x0, y0, log2CbSize, cqtDepth, cbSubdiv, treeType ) { | |
| [...] | |
|     if( cu_qp_delta_enabled_flag && cbSubdiv <= cu_qp_delta_subdiv ) { | |
|         IsCuQpDeltaCoded = 0 | |
|         CuQpDeltaVal = 0 | |
|         xQg = x0 | |
|         yQg = y0 | |
|     } | |
|     if( qt_split_cu_flag[ x0 ][ y0 ] ) { | |
|         x1 = x0 + ( 1 << ( log2CbSize – 1 ) ) | |
|         y1 = y0 + ( 1 << ( log2CbSize – 1 ) ) | |
|         coding_quadtree( x0, y0, log2CbSize – 1, cqtDepth + 1, cbSubdiv + 2, treeType ) | |
|         if( x1 < pic_width_in_luma_samples ) | |
|             coding_quadtree( x1, y0, log2CbSize – 1, cqtDepth + 1, cbSubdiv + 2, treeType ) | |
|         if( y1 < pic_height_in_luma_samples ) | |
|             coding_quadtree( x0, y1, log2CbSize – 1, cqtDepth + 1, cbSubdiv + 2, treeType ) | |
|         if( x1 < pic_width_in_luma_samples && y1 < pic_height_in_luma_samples ) | |
|             coding_quadtree( x1, y1, log2CbSize – 1, cqtDepth + 1, cbSubdiv + 2, treeType ) | |
|     } else | |
|         multi_type_tree( x0, y0, 1 << log2CbSize, 1 << log2CbSize, 0, 0, 0, cbSubdiv, treeType ) | |
| } | |

FIGURE 27

| | Descriptor |
|---|---|
| multi_type_tree( x0, y0, cbWidth, cbHeight, mttDepth, depthOffset, partIdx, cbSubdiv, treeType ) { | |
|     if( ( allowSplitBtVer \|\| allowSplitBtHor \|\| allowSplitTtVer \|\| allowSplitTtHor ) && <br>     ( x0 + cbWidth <= pic_width_in_luma_samples ) && <br>     ( y0 + cbHeight <= pic_height_in_luma_samples ) ) | |
|     mtt_split_cu_flag | ae(v) |
|     if( cu_qp_delta_enabled_flag && cbSubdiv <= cu_qp_delta_subdiv ) { | |
|         IsCuQpDeltaCoded = 0 | |
|         CuQpDeltaVal = 0 | |
|         xQg = x0 | |
|         yQg = y0 | |
|     } | |
|     if( mtt_split_cu_flag ) { | |
|         if( ( allowSplitBtHor \|\| allowSplitTtHor ) && <br>         ( allowSplitBtVer \|\| allowSplitTtVer ) ) | |
|         mtt_split_cu_vertical_flag | ae(v) |
|         if( ( allowSplitBtVer && allowSplitTtVer && mtt_split_cu_vertical_flag ) \|\| <br>         ( allowSplitBtHor && allowSplitTtHor && !mtt_split_cu_vertical_flag ) ) | |
|         mtt_split_cu_Binary_flag | ae(v) |
|         if( MttSplitMode[ x0 ][ y0 ][ mttDepth ] == SPLIT_BT_VER ) { | |
|             depthOffset += ( x0 + cbWidth > pic_width_in_luma_samples ) ? 1 : 0 | |
|             x1 = x0 + ( cbWidth / 2 ) | |
|             multi_type_tree( x0, y0, cbWidth / 2, cbHeight, mttDepth + 1, depthOffset, 0, cbSubdiv + 1, treeType ) | |
|             if( x1 < pic_width_in_luma_samples ) | |
|             multi_type_tree( x1, y0, cbWidth / 2, cbHeightY, mttDepth + 1, depthOffset, 1, cbSubdiv + 1, treeType ) | |
|         } else if( MttSplitMode[ x0 ][ y0 ][ mttDepth ] == SPLIT_BT_HOR ) { | |
|             depthOffset += ( y0 + cbHeight > pic_height_in_luma_samples ) ? 1 : 0 | |
|             y1 = y0 + ( cbHeight / 2 ) | |
|             multi_type_tree( x0, y0, cbWidth, cbHeight / 2, mttDepth + 1, depthOffset, 0, cbSubdiv + 1, treeType ) | |
|             if( y1 < pic_height_in_luma_samples ) | |
|             multi_type_tree( x0, y1, cbWidth, cbHeight / 2, mttDepth + 1, depthOffset, 1, cbSubdiv + 1, treeType ) | |
|         } else if( MttSplitMode[ x0 ][ y0 ][ mttDepth ] == SPLIT_TT_VER ) { | |
|             x1 = x0 + ( cbWidth / 4 ) | |
|             x2 = x0 + ( 3 * cbWidth / 4 ) | |
|             multi_type_tree( x0, y0, cbWidth / 4, cbHeight, mttDepth + 1, depthOffset, 0, cbSubdiv + 2, treeType ) | |

FROM FIGURE 28A

| |
|---|
|       multi_type_tree( x1, y0, cbWidth / 2, cbHeight, mttDepth + 1, depthOffset, 1, cbSubdiv + 1, treeType ) |
|       multi_type_tree( x2, y0, cbWidth / 4, cbHeight, mttDepth + 1, depthOffset, 2, cbSubdiv + 2, treeType ) |
|    } else { /* SPLIT_TT_HOR */ |
|     y1 = y0 + ( cbHeight / 4 ) |
|     y2 = y0 + ( 3 * cbHeight / 4 ) |
|     multi_type_tree( x0, y0, cbWidth, cbHeight / 4, mttDepth + 1, depthOffset, 0, cbSubdiv + 2, treeType ) |
|     multi_type_tree( x0, y1, cbWidth, cbHeight / 2, mttDepth + 1, depthOffset, 1, cbSubdiv + 1, treeType ) |
|     multi_type_tree( x0, y2, cbWidth, cbHeight / 4, mttDepth + 1, depthOffset, 2, cbSubdiv + 2, treeType) |
|    } |
|  } else |
|    coding_unit( x0, y0, cbWidth, cbHeight, treeType ) |
| } |

FIGURE 28B

| coding_quadtree( x0, y0, log2CbSize, cqtDepth, cbSubdiv, QG, treeType ) { | Descriptor |
|---|---|
| [...] | |
|    if( QG && cbSubdiv <= cu_qp_delta_subdiv ) { | |
|       CuQpDeltaCoding = cu_qp_delta_enabled_flag | |
|       CuQpDeltaVal = 0 | |
|       xQg = x0 | |
|       yQg = y0 | |
|    } | |
|    if( qt_split_cu_flag[ x0 ][ y0 ] ) { | |
|       x1 = x0 + ( 1 << ( log2CbSize − 1 ) ) | |
|       y1 = y0 + ( 1 << ( log2CbSize − 1 ) ) | |
|       coding_quadtree( x0, y0, log2CbSize − 1, cqtDepth + 1, cbSubdiv + 2, QG, treeType ) | |
|       if( x1 < pic_width_in_luma_samples ) | |
|          coding_quadtree( x1, y0, log2CbSize − 1, cqtDepth + 1, cbSubdiv + 2, QG, treeType ) | |
|       if( y1 < pic_height_in_luma_samples ) | |
|          coding_quadtree( x0, y1, log2CbSize − 1, cqtDepth + 1, cbSubdiv + 2, QG, treeType ) | |
|       if( x1 < pic_width_in_luma_samples && y1 < pic_height_in_luma_samples ) | |
|          coding_quadtree( x1, y1, log2CbSize − 1, cqtDepth + 1, cbSubdiv + 2, QG, treeType ) | |
|    } else | |
|       multi_type_tree( x0, y0, 1 << log2CbSize, 1 << log2CbSize, 0, 0, 0, cbSubdiv, QG, treeType ) | |
| } | |

FIGURE 29

| | Descriptor |
|---|---|
| multi_type_tree( x0, y0, cbWidth, cbHeight, mttDepth, depthOffset, partIdx, cbSubdiv, QG, treeType ) { | |
|     if( ( allowSplitBtVer \|\| allowSplitBtHor \|\| allowSplitTtVer \|\| allowSplitTtHor ) && <br>      ( x0 + cbWidth <= pic_width_in_luma_samples ) && <br>      ( y0 + cbHeight <= pic_height_in_luma_samples ) ) | |
|         mtt_split_cu_flag | ae(v) |
|     if( QG && cbSubdiv <= cu_qp_delta_subdiv ) { | |
|       CuQpDeltaCoding = cu_qp_delta_enabled_flag | |
|       CuQpDeltaVal = 0 | |
|       xQg = x0 | |
|       yQg = y0 | |
|     } | |
|     if( mtt_split_cu_flag ) { | |
|       if( ( allowSplitBtHor \|\| allowSplitTtHor ) && <br>        ( allowSplitBtVer \|\| allowSplitTtVer ) ) | |
|         mtt_split_cu_vertical_flag | ae(v) |
|       if( ( allowSplitBtVer && allowSplitTtVer && mtt_split_cu_vertical_flag ) \|\| <br>        ( allowSplitBtHor && allowSplitTtHor && !mtt_split_cu_vertical_flag ) ) | |
|         mtt_split_cu_Binary_flag | ae(v) |
|       if( MttSplitMode[ x0 ][ y0 ][ mttDepth ] == SPLIT_BT_VER ) { | |
|         depthOffset += ( x0 + cbWidth > pic_width_in_luma_samples ) ? 1 : 0 | |
|         x1 = x0 + ( cbWidth / 2 ) | |
|         multi_type_tree( x0, y0, cbWidth / 2, cbHeight, mttDepth + 1, depthOffset, 0, cbSubdiv + 1, QG, treeType ) | |
|         if( x1 < pic_width_in_luma_samples ) | |
|           multi_type_tree( x1, y0, cbWidth / 2, cbHeightY, mttDepth + 1, depthOffset, 1, cbSubdiv + 1, QG, treeType ) | |
|       } else if( MttSplitMode[ x0 ][ y0 ][ mttDepth ] == SPLIT_BT_HOR ) { | |
|         depthOffset += ( y0 + cbHeight > pic_height_in_luma_samples ) ? 1 : 0 | |
|         y1 = y0 + ( cbHeight / 2 ) | |
|         multi_type_tree( x0, y0, cbWidth, cbHeight / 2, mttDepth + 1, depthOffset, 0, cbSubdiv + 1, QG, treeType ) | |
|         if( y1 < pic_height_in_luma_samples ) | |
|           multi_type_tree( x0, y1, cbWidth, cbHeight / 2, mttDepth + 1, depthOffset, 1, cbSubdiv + 1, QG, treeType ) | |
|       } else if( MttSplitMode[ x0 ][ y0 ][ mttDepth ] == SPLIT_TT_VER ) { | |
|         x1 = x0 + ( cbWidth / 4 ) | |
|         x2 = x0 + ( 3 * cbWidth / 4 ) | |
|         sQG = QG && (cbSubdiv + 2 <= cu_qp_delta_subdiv) | |
|         multi_type_tree( x0, y0, cbWidth / 4, cbHeight, mttDepth + 1, depthOffset, 0, cbSubdiv + 2, sQG, treeType ) | |
|         multi_type_tree( x1, y0, cbWidth / 2, cbHeight, mttDepth + 1, depthOffset, 1, cbSubdiv + 1, sQG, treeType ) | |

FROM FIGURE 30A

|  |  |
|---|---|
| multi_type_tree( x2, y0, cbWidth / 4, cbHeight, mttDepth + 1, depthOffset, 2, cbSubdiv + 2, sQG, treeType ) |  |
| } else { /* SPLIT_TT_HOR */ |  |
| y1 = y0 + ( cbHeight / 4 ) |  |
| y2 = y0 + ( 3 * cbHeight / 4 ) |  |
| sQG = QG && (cbSubdiv + 2 <= cu_qp_delta_subdiv) |  |
| multi_type_tree( x0, y0, cbWidth, cbHeight / 4, mttDepth + 1, depthOffset, 0, cbSubdiv + 2, sQG, treeType ) |  |
| multi_type_tree( x0, y1, cbWidth, cbHeight / 2, mttDepth + 1, depthOffset, 1, cbSubdiv + 1, sQG, treeType ) |  |
| multi_type_tree( x0, y2, cbWidth, cbHeight / 4, mttDepth + 1, depthOffset, 2, cbSubdiv + 2, sQG, treeType) |  |
| } |  |
| } else |  |
| coding_unit( x0, y0, cbWidth, cbHeight, treeType ) |  |
| } |  |

FIGURE 30B

| transform_unit( x0, y0, tbWidth, tbHeight, treeType ) { | Descriptor |
|---|---|
| [...] |  |
| if( [...] ) /* QP-delta coding conditions (e.g. cbf) */ { |  |
|   if( CuQpDeltaCoding ) { |  |
|     CuQpDeltaCoding = 0 |  |
|     cu_qp_delta_abs | ae(v) |
|     if( cp_qp_delta_abs ) |  |
|       cu_qp_delta_sign_flag | ae(v) |
|   } |  |
|   [...] |  |
| } |  |

FIGURE 31

| coding_tree_unit( ) { | Descriptor |
|---|---|
| [...] | |
| if( slice_type = = I && qtbtt_dual_tree_intra_flag ) { | |
|     dual_tree_implicit_qt_split ( xCtb, yCtb, CtbLog2SizeY, 0, 0, 1, *1* ) | |
| else | |
|     coding_quadtree( xCtb, yCtb, CtbLog2SizeY, 0, 0, 1, *1*, SINGLE_TREE ) | |
| } | |

Figure 32

| coding_quadtree( x0, y0, log2CbSize, cqtDepth, cbSubdiv, QG, *QGc*, treeType ) { | Descriptor |
|---|---|
| [...] | |
| if( QG && cbSubdiv <= cu_qp_delta_subdiv ) { | |
|     IsCuQpDeltaCoding = cu_qp_delta_enabled_flag | |
|     CuQpDeltaVal = 0 | |
|     xQg = x0 | |
|     yQg = y0 | |
| } | |
| if( *QGc* && cbSubdiv <= cu_chroma_qp_offset_subdiv ) | |
|     CuChromaQpOffsetCoding = cu_chroma_qp_offset_enabled_flag | |
| if( qt_split_cu_flag[ x0 ][ y0 ] ) { | |
|     x1 = x0 + ( 1 << ( log2CbSize – 1 ) ) | |
|     y1 = y0 + ( 1 << ( log2CbSize – 1 ) ) | |
|     coding_quadtree( x0, y0, log2CbSize – 1, cqtDepth + 1, cbSubdiv + 2, QG, *QGc*, treeType ) | |
|     if( x1 < pic_width_in_luma_samples ) | |
|         coding_quadtree( x1, y0, log2CbSize – 1, cqtDepth + 1, cbSubdiv + 2, QG, *QGc*, treeType ) | |
|     if( y1 < pic_height_in_luma_samples ) | |
|         coding_quadtree( x0, y1, log2CbSize – 1, cqtDepth + 1, cbSubdiv + 2, QG, *QGc*, treeType ) | |
|     if( x1 < pic_width_in_luma_samples && y1 < pic_height_in_luma_samples ) | |
|         coding_quadtree( x1, y1, log2CbSize – 1, cqtDepth + 1, cbSubdiv + 2, QG, *QGc*, treeType ) | |
| } else | |
|     multi_type_tree( x0, y0, 1 << log2CbSize, 1 << log2CbSize, 0, 0, 0, cbSubdiv, QG, *QGc*, treeType ) | |
| } | |

Figure 33

| multi_type_tree( x0, y0, cbWidth, cbHeight, mttDepth, depthOffset, partIdx, cbSubdiv, treeType ) { | Descriptor |
|---|---|
| [...] | |
|    } else { /* SPLIT_TT_HOR */ | |
|      y1 = y0 + ( cbHeight / 4 ) | |
|      y2 = y0 + ( 3 * cbHeight / 4 ) | |
|      sQG = QG && (cbSubdiv + 2 <= cu_qp_delta_subdiv) | |
|      *sQGc = QGc && (cbSubdiv + 2 <= cu_chroma_qp_offset_subdiv)* | |
|      multi_type_tree( x0, y0, cbWidth, cbHeight / 4, mttDepth + 1, depthOffset, 0, cbSubdiv + 2, sQG, *sQGc*, treeType ) | |
|      multi_type_tree( x0, y1, cbWidth, cbHeight / 2, mttDepth + 1, depthOffset, 1, cbSubdiv + 1, sQG, *sQGc*, treeType ) | |
|      multi_type_tree( x0, y2, cbWidth, cbHeight / 4, mttDepth + 1, depthOffset, 2, cbSubdiv + 2, sQG, *sQGc*, treeType) | |
|    } | |
|  } else | |
|    coding_unit( x0, y0, cbWidth, cbHeight, treeType ) | |
| } | |

Figure 34

| transform_unit( x0, y0, tbWidth, tbHeight, treeType ) { | Descriptor |
|---|---|
|  [...] | |
|  if( [...] /* QP-delta coding conditions (e.g. cbf) */) { | |
|   if( CuQpDeltaCoding ) { | |
|    CuQpDeltaCoding = 0 | |
|    cu_qp_delta_abs | ae(v) |
|    if( cp_qp_delta_abs ) | |
|     cu_qp_delta_sign_flag | ae(v) |
|   } | |
|  if( [...] /* chroma QP offset coding conditions (e.g. cbf) */ && *CuChromaQpOffsetCoding* ) { | |
|    cu_chroma_qp_offset_flag | ae(v) |
|    if( cu_chroma_qp_offset_flag && chroma_qp_offset_list_len_minus1 > 0 ) | |
|     cu_chroma_qp_offset_idx | ae(v) |
|   } | |
|  [...] | |
| } | |

Figure 35

QUANTIZATION FOR VIDEO ENCODING OR DECODING BASED ON THE SURFACE OF A BLOCK

CROSS REFERENCE TO RELATED APPLICATIONS

This application is the national stage entry under 35 U.S.C. § 371 of International Application PCT/US2019/057149, filed Oct. 21, 2019 which was published in accordance with PCT Article 21(2) on May 14, 2020, in English, and which claims the benefit of European Patent Application No. 18306824.6, filed Dec. 21, 2018.

TECHNICAL FIELD

The disclosure is in the field of video compression, and at least one embodiment relates more specifically to determining quantization parameters based on the surface of a block.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a first aspect of at least one embodiment, a method for video coding comprises, when a block of an image is partitioned into sub-blocks, associating a value representative of the surface of the sub-block; and determining a quantization parameter for the sub-block based on the value representative of the surface of the sub-block.

According to a second aspect of at least one embodiment, a method for video decoding comprises, when a block of an image is partitioned into sub-blocks, associating a value representative of the surface of the sub-block; and determining a quantization parameter for the sub-block based on the value representative of the surface of the sub-block.

According to a third aspect of at least one embodiment, an apparatus comprising a video encoder for encoding picture data comprises, when a block of an image is partitioned into sub-blocks, associating a value representative of the surface of the sub-block; and determining a quantization parameter for the sub-block based on the value representative of the surface of the sub-block.

According to a fourth aspect of at least one embodiment, an apparatus comprising a video decoder for decoding picture data comprises, when a block of an image is partitioned into sub-blocks, associating a value representative of the surface of the sub-block; and determining a quantization parameter for the sub-block based on the value representative of the surface of the sub-block.

According to a variant embodiment of first, second, third or fourth aspect, the value representative of the surface of the sub-block is a subdivision level counter that is incremented by a value representative of the type of split of the sub-block when a block of an image is partitioned into sub-blocks. According to a further variant embodiment of first, second, third or fourth aspect, a new quantization group is enabled according to the type of split while the subdivision level counter of a sub-block is smaller than or equal to a maximal value of subdivision. According to a further variant embodiment of first, second, third or fourth aspect, new quantization groups are disabled when a block of an image is partitioned into sub-blocks according to ternary split and when the subdivision level counter of the smallest sub-block is greater than a maximal value of subdivision.

According to a variant embodiment of first, second, third or fourth aspect, or variants of these embodiments, the increment value is equal to two for all sub-blocks of a quad-split, one for all sub-blocks of binary split, two for side sub-blocks of ternary-split and one for center sub-block of a ternary-split. According to another variant embodiment of first, second, third or fourth aspect, or variants of these embodiments, the increment value is equal to four for all sub-blocks of a quad-split, two for all sub-blocks of binary split, four for side sub-blocks and two for center sub-block of a ternary-split, four for the smallest sub-block and one for the biggest sub-block of an asymmetric one-fourth binary split, and three for the smallest sub-block and one for the biggest sub-block of an asymmetric one-third binary split.

According to a fifth aspect of at least one embodiment, a storage media stores video bitstream data comprising at least a syntax data element representative of a value representative of a surface of a sub-block, wherein the sub-block is resulting of the partitioning of a block of an image of the video. According to a variant embodiment of fifth embodiment, the value representative of the surface of the sub-block is a subdivision level counter that is incremented by a value representative of a type of split of the sub-block when a block of an image is partitioned into sub-blocks. According to a further variant embodiment of fifth embodiment, the increment value is equal to two for all sub-blocks of a quad-split, one for all sub-blocks of binary split, two for side sub-blocks of ternary-split and one for center sub-block of a ternary-split.

According to a sixth aspect of at least one embodiment, a computer program comprising program code instructions executable by a processor is presented, the computer program implementing the steps of a method according to at least the first or second aspect.

According to a seventh aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 17 illustrates an example of values of the subdiv counter when the process is applied to the two successive asymmetric 1/4 binary splits in opposite directions using the first variant for AB-split.

FIGS. 18A, 18B, 18C, 18D and 18E illustrate examples of relationship between split types and subdiv increments according to a second variant embodiment for AB-split.

FIG. 24 illustrates a table representing an example of syntax for picture parameter set (PPS) according to an embodiment using a subdivision level counter.

FIGS. 25 to 28B illustrate tables representing example of syntax for implementing the main embodiment.

FIGS. 29 to 31 illustrate tables representing example of syntax for implementing the main embodiment and handling the QG start detection.

FIGS. 32 to 35 illustrate tables representing example of syntax for implementing the main embodiment and handling the QG start detection for chroma related elements.

DETAILED DESCRIPTION

In at least one embodiment, video encoding or decoding splits an image into a plurality of blocks of various sizes and a subdivision level counter (hereafter named "subdiv") is associated to each of the partitions and the blocks. The split may be recursive so that a block is further split into a plurality of blocks (called sub-blocks) and so on. The value of this counter for a block or sub-block is representative of the size of the block or sub-block and is used to determine the quantization parameter for the block or the sub- and the quantization group which the block belongs to. As a result, the same quantization parameters will be used for blocks of similar size, thus providing a consistent encoding/decoding.

For clarity of description, the following description will describe aspects with reference to embodiments involving video compression technology such as, for example, High Efficiency Video Coding (HEVC) or Versatile Video Coding (VVC), a new standard being developed by the Joint Video Experts Team (JVET). However, the described aspects are applicable to other video processing technologies and standards.

Figure 1:
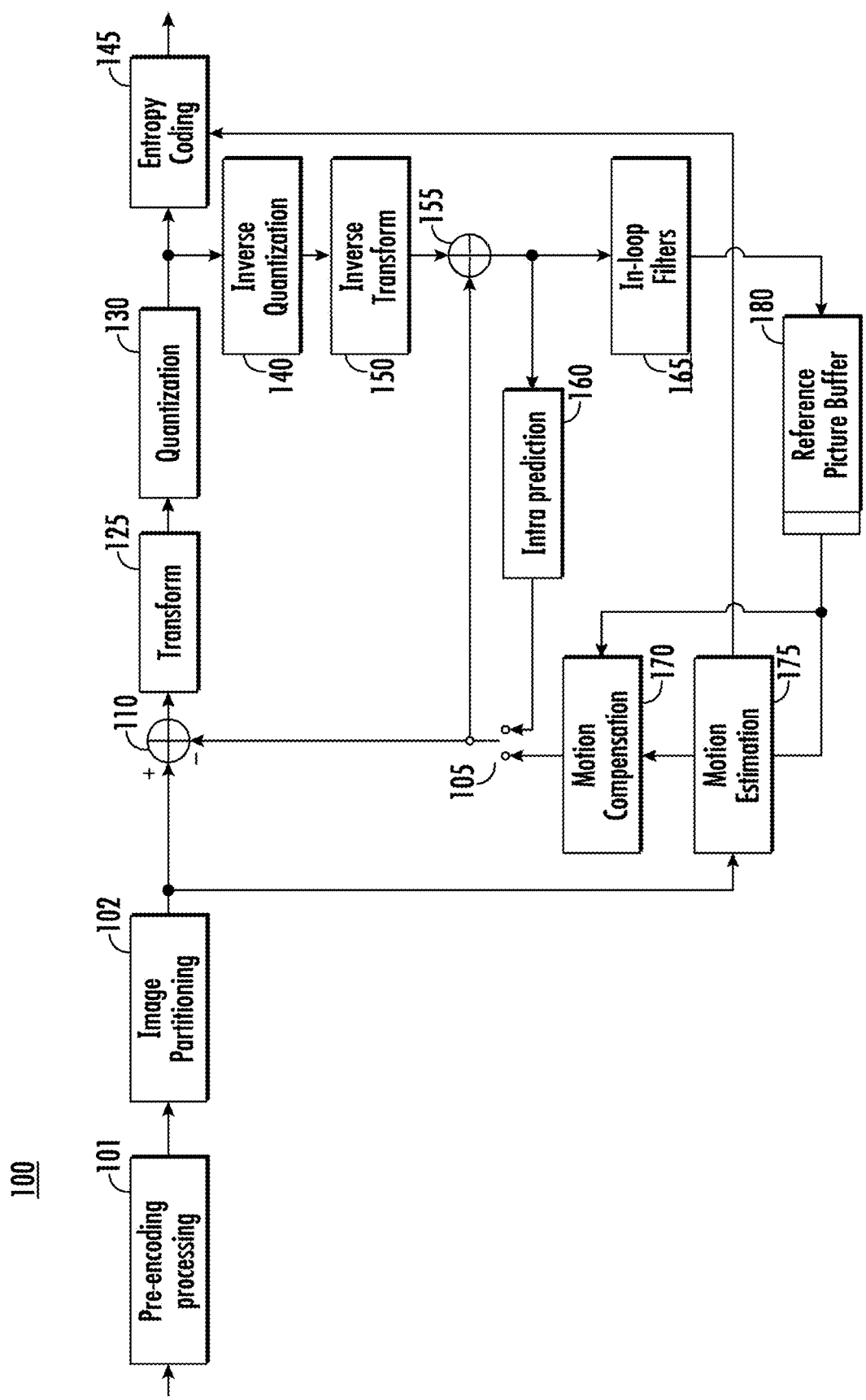
FIG. 1 illustrates a block diagram of an example of video encoder 100.
Figure 2:
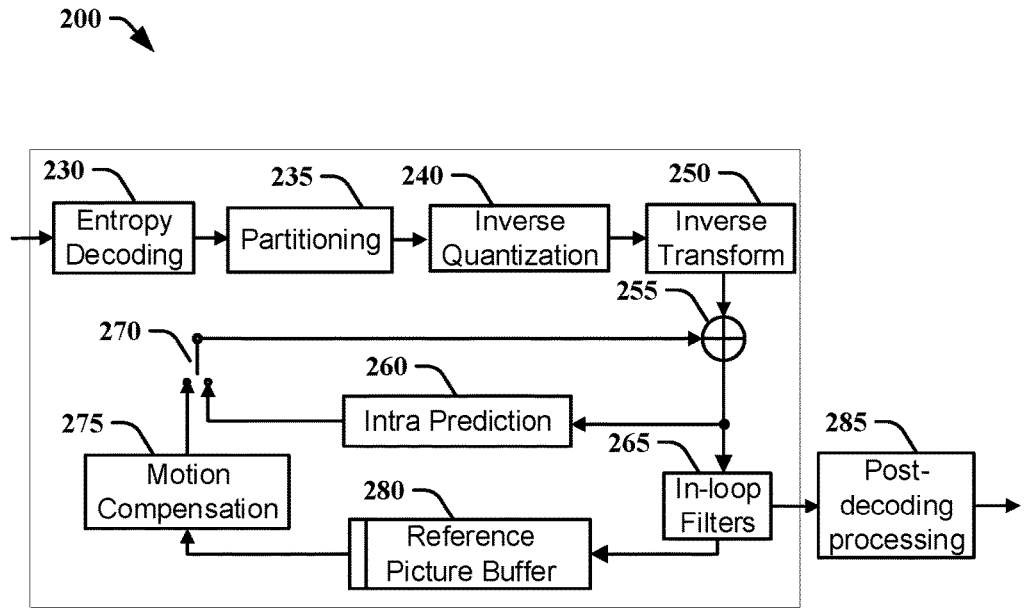
FIG. 2 illustrates a block diagram of an example of video decoder 200.
Figure 3:
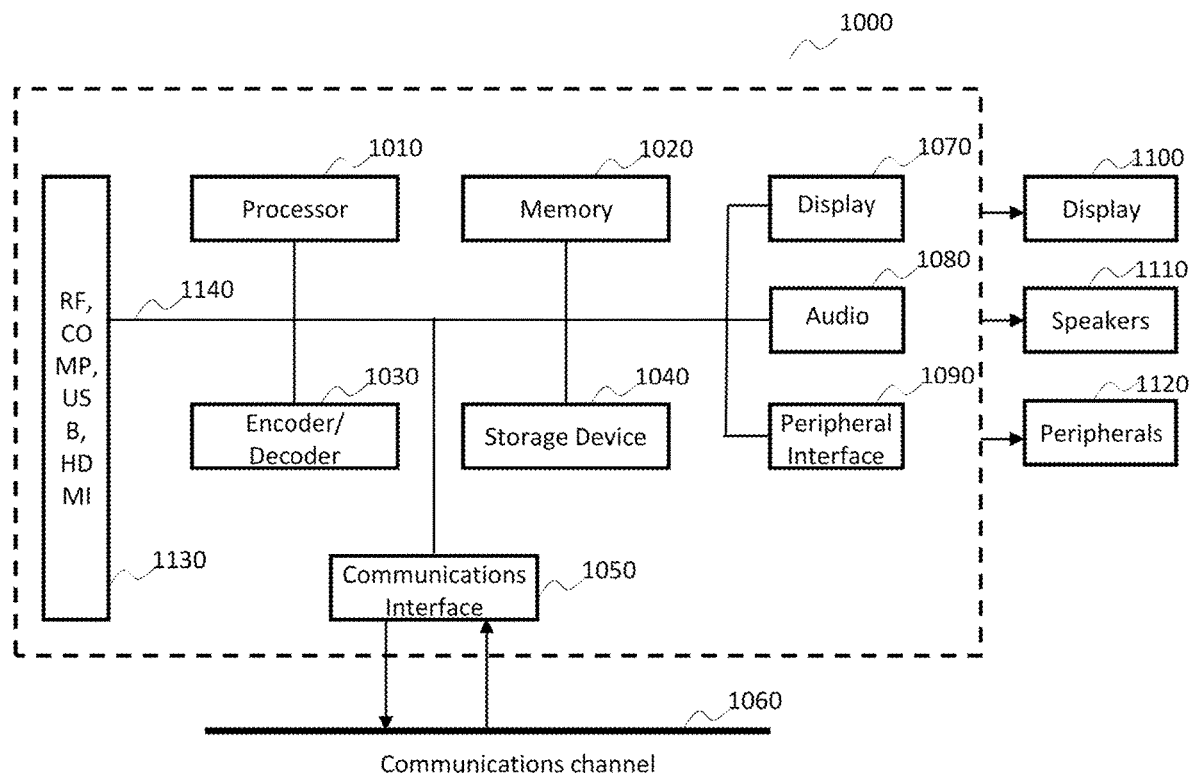
FIG. 3 illustrates a block diagram of an example of system in which various aspects and embodiments are implemented.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the quantization module (130) of a video encoder (100) as shown in FIG. 1 and/or the inverse quantization module (240) of a video decoder (200) as shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example regarding block sizes. The specific values are for example purposes and the aspects described are not limited to these specific values.

FIG. 1 illustrates a block diagram of an example of video encoder 100. Variations of this encoder 100 are contemplated, but the encoder 100 is described below for purposes of clarity without describing all expected variations. For example, the encoder of FIG. 1 may be an HEVC encoder in which improvements are made to the HEVC standard or an encoder employing technologies similar to HEVC, such as a JEM (Joint Exploration Model) encoder under development by JVET.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is partitioned (102) and processed in coding units representing a portion of the picture. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block. The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes. The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of an example of video decoder 200. Variations of this decoder 200 are contemplated, but the decoder 200 is described below for purposes of clarity without describing all expected variations. For example, the decoder of FIG. 1 may be an HEVC decoder in which improvements are made to the HEVC standard or a decoder employing technologies similar to HEVC, such as a JEM decoder under development by JVET.

In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data. In particular, the input of the decoder includes a video bitstream, which can be generated by video encoder 100 and comprises syntax data elements allowing to reconstruct the video. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280). The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC, or VVC.

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna. Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 4:
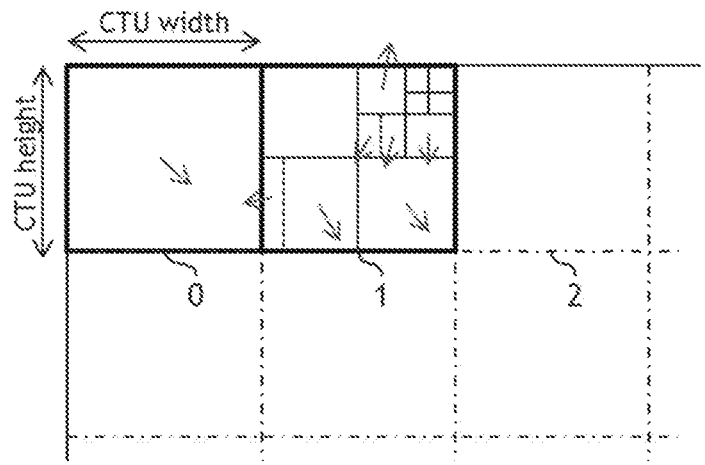
FIG. 4 illustrates an example of coding tree unit and coding tree in the compressed domain.

FIG. 4 illustrates an example of coding tree unit and coding tree in the compressed domain. In the HEVC video compression standard, a picture is partitioned into so-called Coding Tree Units (CTU), which size is for example 64×64, 128×128, or 256×256 pixels. Each CTU is represented by a Coding Tree in the compressed domain. This is a quad-tree division of the CTU, where each leaf is called a Coding Unit (CU).

Figure 5:
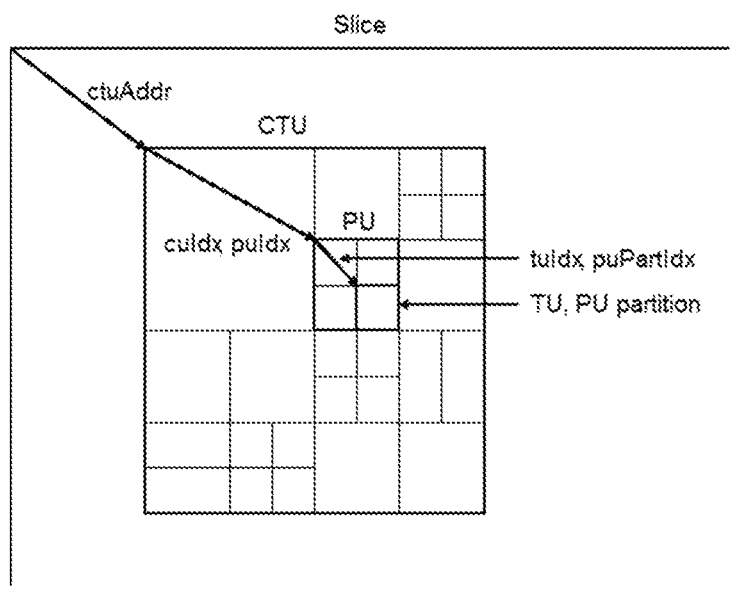
FIG. 5 illustrates an example of division of a CTU into coding units, prediction units and transform units.

FIG. 5 illustrates an example of division of a CTU into coding units, prediction units and transform units. Each CU is then given some Intra or Inter prediction parameters Prediction Info). To do so, it is spatially partitioned into one or more Prediction Units (PUs), each PU being assigned some prediction information. The Intra or Inter coding mode is assigned on the CU level.

A video codec splits the picture into square or rectangular blocks, conventionally named Coding Units (CU) or Transform Units. Splitting can be recursive. The split depth of a current block thus refers to the number of recursive splits for obtaining the current block. These blocks can then be predicted and the residuals (difference between original and prediction) are transformed to calculate the frequency coefficients. On the encoder side, quantization usually comprises dividing resulting transformed coefficient by a specific quantization scale, also named quantization step size (Qstep). The decoder then multiplies the result by the same Qstep to recover an approximation of the original coefficient.

Usually, a quantization parameter (QP) is used to determine the quantization step size Qstep. In the example of HEVC, the QP can take 52 values from 0 to 51 (QP range). An increase of 1 in QP means an increase of the quantization step size Qstep by approximately 12% (i.e., $2^{1/6}$). The resulting relationship between QP and the equivalent quantization step size is given by the following equations in the example of HEVC ("equal" symbol meaning integer equality):

$$Qstep(QP) = (2^{1/6})^{QP-4} \qquad \text{(eq. 1)}$$

Other functions and QP range than the one defined above in (eq. 1) may be used in the embodiments described below. For example, in VVC, QP range has been extended to 63.

In the following, the term "block" is used. It can be equivalently replaced by the term "CU", which groups several blocks such as luma and/or chroma blocks or three RGB blocks for example.

Local adjustment of quantization step is typically possible by specifying an offset (QP-delta) from the QP of the current picture (or part of it, such as a slice) (a.k.a. QP basis). In the example of HEVC, QP-delta can be specified for each group of blocks, called "quantization groups" (QG), defined by a given maximum split depth (diff_cu_qp_delta_depth syntax element found in Picture Parameter Set): all blocks resulting from further splits belong to the same quantization group and share the same QP (more precisely, they share the same QP prediction and specify at most one QP-delta). In the example of HEVC, all blocks at a given split depth have the same size, because all splits are Quad-splits (Q-split) thus resulting in consistent QP values for blocks of same size.

Figure 6:
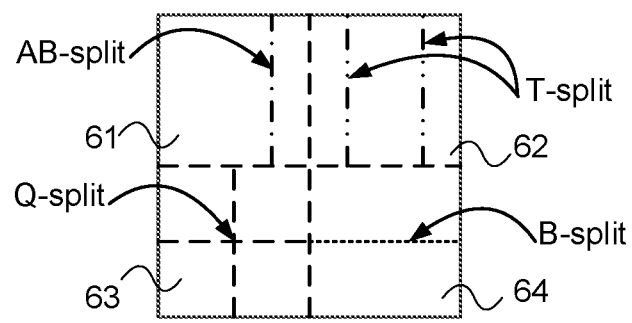
FIG. 6 illustrates various split types, as found in VVC for example.

FIG. 6 illustrates various split types, as found in VVC for example. In the example of codecs like VVC, other split types are possible in addition to Q-split, comprising Binary split (B-split), Ternary-split (T-split), and Asymmetric Binary split (AB-split). In this figure, Q-splits are indicated by dashed lines, and other split types are indicated by dashed-point lines. The top-level Q-split defines four blocks of same size. At the second-level split, each of the blocks resulting from the Q-split are split using another type of split: the upper left block is split using AB-split, the top right block is split using T-split, the bottom left block is split using Q-split and the bottom right block is split using B-split. Such splits result in blocks that can have different sizes at the same split depth (second level). Indeed, the block 61 of the AB-split block is bigger than the block 62 of the T-split or the block 63 of the Q-split or the block 64 of the B-split block. Although all these blocks are at the same level, the size of these blocks is not identical and can be very different after multiple splits. Thus, the visual importance of blocks, which is at least partly related to its size, is not homogeneous.

Figure 7A:
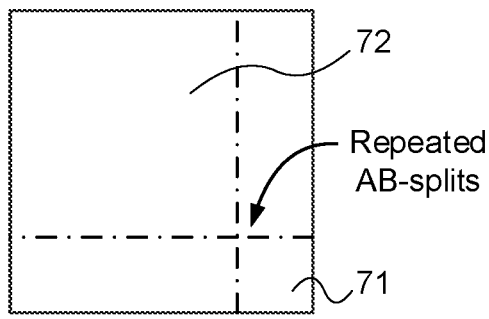
FIGS. 7A and 7B illustrate the impact of repeated splits on the block size.
Figure 7B:
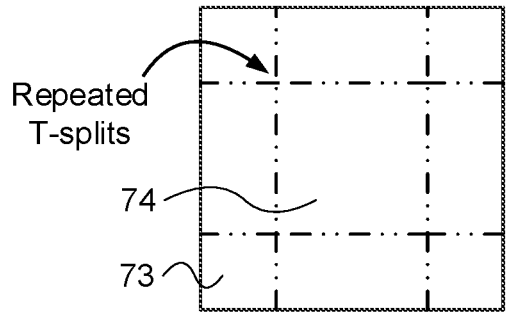

FIGS. 7A and 7B illustrates the impact of repeated splits on the block size. FIG. 7B shows repeated horizontal and vertical Ternary-splits. In this case, the center block (74) is much bigger than the corner blocks (73) while having the same split depth. Using the split depth information to define Quantization Groups can thus result in Quantization Groups with non-uniform size and may lead to undesirable results compared to HEVC rationale where the QP granularity (quantization group size) is the same all over the picture or slice. FIG. 7A shows repeated horizontal and vertical AB-splits and leads to the same issue with blocks 71 and 72.

Figure 8:
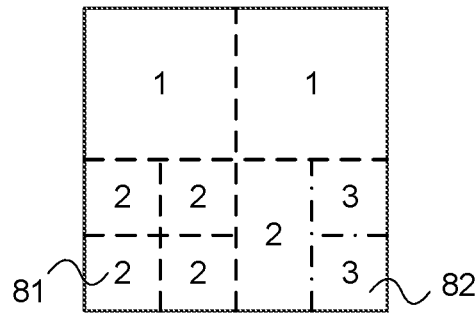
FIG. 8 illustrates various blocks with same size at different split levels.

FIG. 8 illustrates various blocks with same size at different split levels. Indeed, a same block size can be obtained at different split depths, depending on split types, as illustrated in FIG. 7 where numbers within the blocks indicate split depth for each block. In these examples, blocks of surface $1/16^{th}$ of the parent block have a split depth of either 2 (bottom left block 81) or 3 (bottom right block 82).

Figure 9:
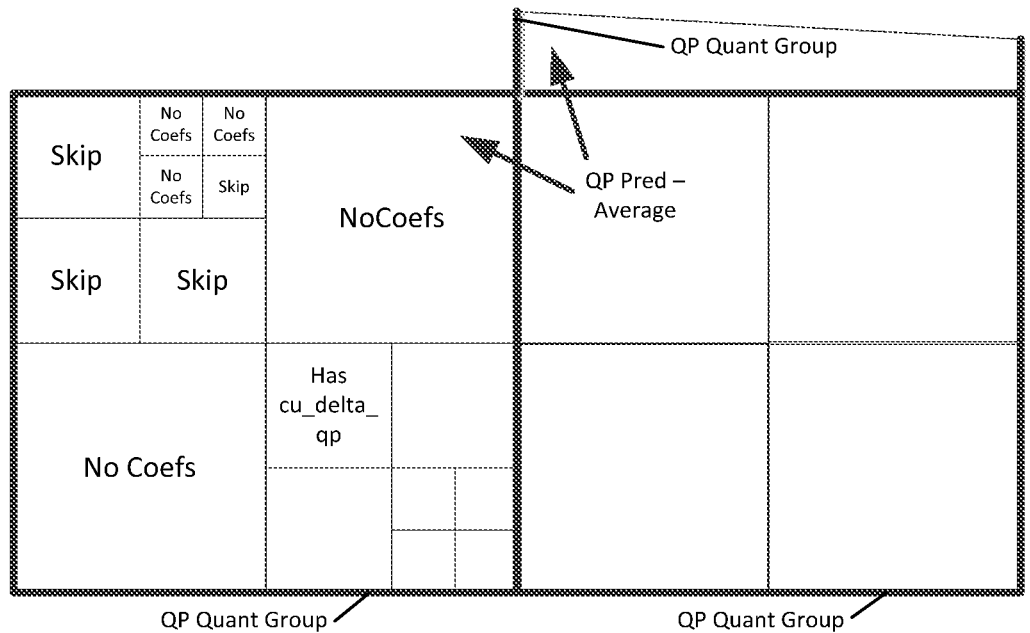
FIG. 9 illustrates the use of quantization groups in the HEVC specification.

FIG. 9 illustrates the use of quantization groups in the HEVC specification. The HEVC specification comprises a separate QP-delta parsing from QP prediction. A new prediction and a new QP-delta are enabled by the detection of a QG start. For that purpose, a flag (IsCuQpDeltaCoded) is set to false when the split depth is less than or equal than depthLimit, a given threshold signaled in the stream. Then, in Transform Unit (TU), when block residual is non-empty (and QP offsets signalling are enabled at high level), and IsCuQpDeltaCoded is still false, this flag is set to true and QP offset is coded/decoded. In the decoding process, QP derivation for each block involves QP prediction, performed using the top and left neighboring blocks of the top-left corner of the quantization group. The position of this top-left corner is determined using a simple alignment of the position of the current block on the QG grid, as shown in FIG. 9. This works and is consistent with the previous point because all splits are Quad-splits, thus QGs have the same (minimum) size and are aligned on a grid matching the split depth limit. However, when using video coding with different split types than Q-splits as introduced above, such as those used in VVC for example, such simple derivation of the position of the QG is not correct anymore, since different split types result in partitions with various sizes. Blocks at a given split depth no longer form a regular grid.

Embodiments described hereafter have been designed with the foregoing in mind.

Subdivision Level Counter

Figure 10:
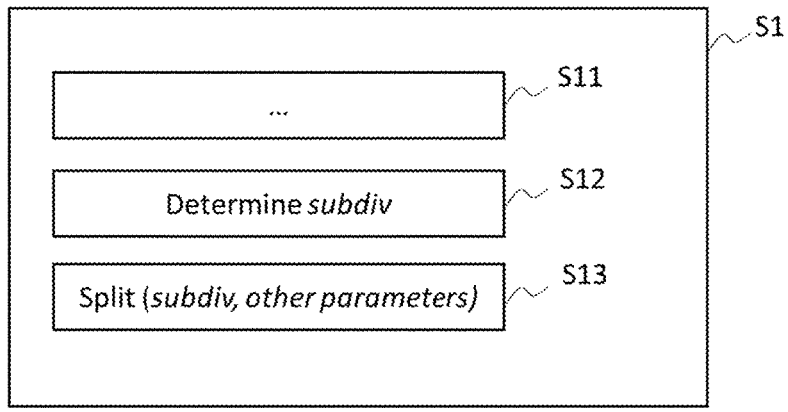
FIG. 10 illustrates at least one embodiment related to the use of a subdivision level counter subdiv.

FIG. 10 illustrates at least one embodiment related to the use of a subdivision level counter. Such counter (hereafter named "subdiv") is closely related to block surface or at least representative of the size of a block, thus representative of the surface of a block or also representative of the number of samples of the block. When an image is split into a plurality of blocks of various sizes, a subdivision level counter (hereafter named "subdiv") is associated to each of the partitions and the blocks. The value of subdiv for a block is determined at least according to the type of split. The value of subdiv can be used to determine the quantization parameter for the block and the quantization group which the block belongs to. As a result, the same quantization parameters will be used for blocks of similar size, thus providing a consistent encoding/decoding.

In at least one embodiment, an analysis is done when splitting a partition, according to the subdivision level counter subdiv, a maximal value of subdivision level and the type of split, in order to determine the start of a new quantization group and when it is the case, the current position of the partition is propagated to the further splitted partitions to be stored with these partition and serve in the prediction process when decoding.

In at least one embodiment, a recursive process assigns a subdivision level counter subdiv (a positive integer value) to each block. For that, the process first initializes subdiv to zero at the root of the split tree. Then, for each split, the value of subdiv is propagated to each partition (conventionally called sub-block) created after being incremented from the former subdiv value, the increment value depending on the type of split and the partition position within the split. While performing block or sub-block splitting, a subdivision level is attached to each sub-partition, in addition to the split depth. The subdivision level is incremented from parent node's one, depending on split type and partition number.

Such recursive split function is represented by S1 in FIG. 10. After performing other functions in S11 related to conventional splitting function, the value of subdiv is determined in S12 based on the type of split and the partition is recursively split in S13 with the subdiv values attached to each sub partition. This overall process is hereafter named subdiv process.

The encoder 100 of FIG. 1, decoder 200 of FIG. 2 and system 1000 of FIG. 3 are adapted to implement at least one of the embodiments described herein and thus are configured to handle a subdiv counter through a subdiv process.

Figure 11A:
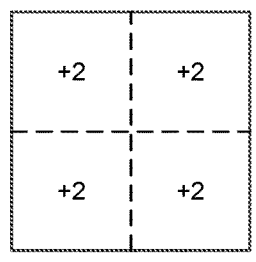
FIGS. 11A, 11B and 11C illustrate examples of relationships between split types and subdiv increments according to an embodiment.
Figure 11B:
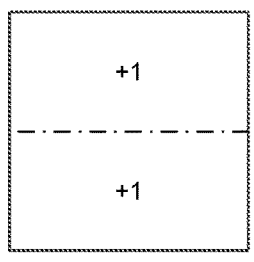
Figure 11C:
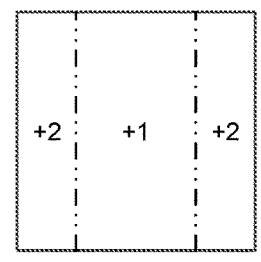

FIGS. 11A, 11B and 11C illustrate examples of relationships between split types and subdiv increments according to an embodiment. In at least one embodiment, the type of split considered are Q-Split, B-split and T-Split and the corresponding increments are done as follows:

for a Q-split: incQ=+2 for all partitions of Quad-split (FIG. 11A), for a B-split: incB=+1 for all partitions of Binary split which can be either horizontal or vertical (FIG. 11B), for a T-split: incTS=+2 for side partitions of Ternary-split, which can be either horizontal or vertical, and incTC=+1 for center partition (FIG. 11C)

Figure 12:
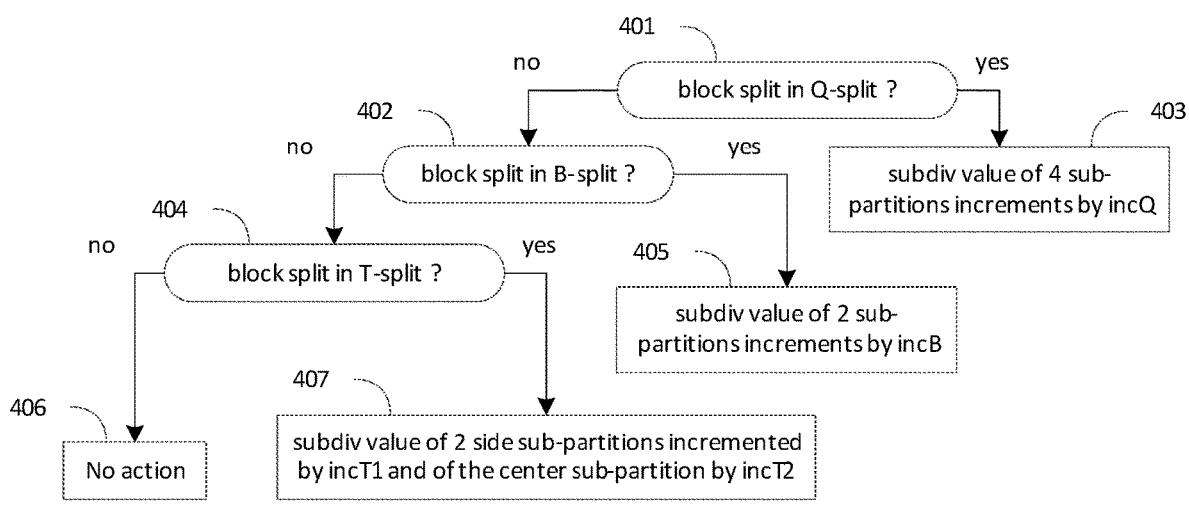
FIG. 12 illustrates an example of block diagram of the subdiv process according to an embodiment.

FIG. 12 illustrates an example of block diagram of the subdiv process according to an embodiment. In this figure, increments of subdiv parameters are generically noted incQ for the Q-split case, incB for the B-split case, incTS and incTC for the T-split case and their value are defined as introduced above. In step 401, when it is determined that the split type is a Q-split, the subdiv value of all 4 sub partitions is incremented in step 403 by incQ=+2. In step 402, when it is determined that the split type is a B-split, the subdiv value of both sub partitions is incremented in step 405 by incB=+1. In step 404, when it is determined that the split type is a T-split, the subdiv value of side partitions is incremented by incTS=+2 and the subdiv value of side partitions is incremented by incTC=+1 in step 407.

Figure 13A:
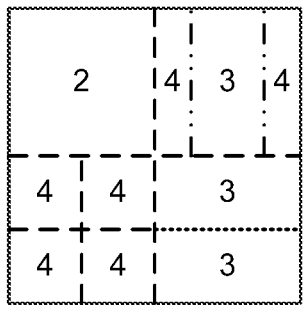
FIGS. 13A, 13B and 13C illustrate examples of values of the subdiv counter when the process is applied to the examples of FIGS. 6 and 7.
Figure 13B:
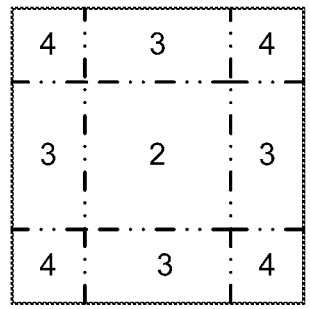
Figure 13C:
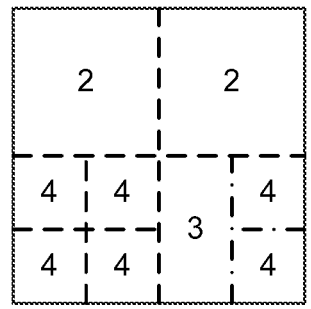

FIGS. 13A, 13B and 13C illustrate examples of values of the subdiv counter when the process is applied to the examples of FIGS. 6 and 7. However, in this illustration, the AB-Split of upper left block is replaced by no split since the embodiment of FIG. 11 does not handle AB-split partitions. It can be observed that the value of subdiv is much more linked to the actual block size than a split depth parameter would be.

One application of this principle is used during quantization and allocates a same number of samples to blocks with the same value of subdiv since they have the same surface. Therefore, in at least one embodiment, the specification of a quantization group is related to the subdiv value of the considered coding group. In one embodiment, the determination of the quantization group can be based on the comparison of the subdiv value to a maximum subdiv value (herein named diff_cu_qp_delta_subdiv) that is signalled at a higher level (for example in PPS, slice header, tiles group header, tile header). For example, a quantization group is specified as the set of blocks resulting from splits of a parent block with subdiv>=diff_cu_qp_delta_subdiv. Such set of blocks make a same quantization group. Thanks to the subdiv derivation process described above, quantization groups have the same number of samples (=same surface)—or are bigger if subdiv limit is not reached (not enough splits). For example, in FIG. 13A, the bottom left block and top-right blocks have not the same shape but similar surfaces and share a same value of subdiv. Moreover, this provides a behavior similar to HEVC. Indeed, in case there are only Q-splits, this method produces the same quantization groups as HEVC.

In at least one embodiment, the number of samples (=surface) of a block is easily computed from the value of subdiv as follows:

$$block\_surface=CTB\_surface>>subdiv$$

In another embodiment, subdiv may also be useful for other purposes. One example is to derive some CABAC context id (e.g. for split mode) based on the value of subdiv.

First Variant for AB-Split

At least one embodiment relates to video coding using all split types illustrated in FIG. 6, thus using also the AB-split in addition to Q-split, B-split and T-split as before.

Figure 14A:
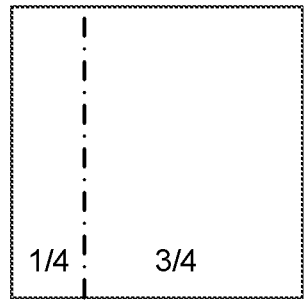
FIGS. 14A and 14B illustrate the different types of asymmetric binary split.
Figure 14B:
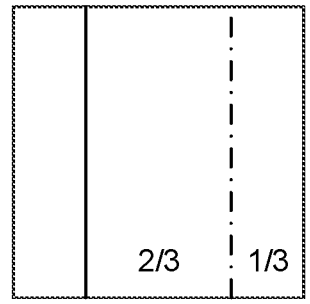

FIGS. 14A and 14B illustrate the different types of asymmetric binary split. With AB-split, the number of samples is not divided by a power of two for both sides: the ratios are either 3/4 and 1/4, or 2/3 and 1/3 when further AB-splitting a 3/4 partition in the same direction.

Figure 14C:
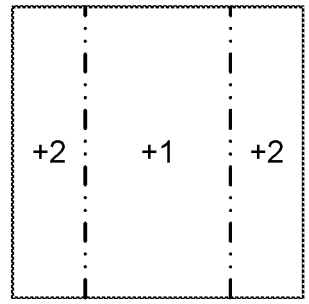
FIG. 14C illustrates an example result of a T-split.

Also, two successive asymmetric Binary splits equivalent to a Ternary-split should give the same subdivision levels as the equivalent Ternary-split as shown in FIG. 14C.

In at least one embodiment, a method compatible with increments described previously for Q-split, B-split, and T-split, and still approximating CTB/block surface ratio with 2^subdiv, applies the following subdiv increments for AB-split cases:

For 1/4 AB-split: incAB1=+0 for the large part and incAB2=+2 for the small part

For 1/3 AB-split: incAB3=+1 for the large part and incAB4=+2 for the small part

Figure 15A:
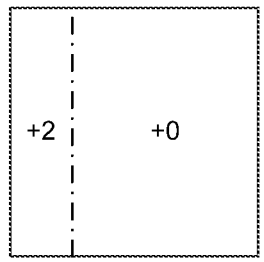
FIGS. 15A and 15B illustrate examples of relationship between split types and subdiv increments according to a first variant embodiment for AB-split.
Figure 15B:
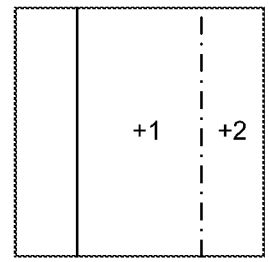
Figure 16A:
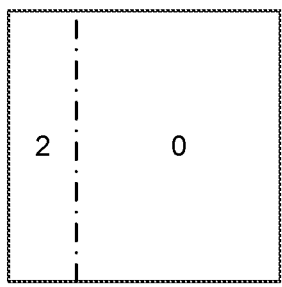
FIGS. 16A, 16B and 16C illustrate examples of values of the subdiv counter when the process is applied to the two successive asymmetric Binary splits equivalent to a Ternary-split.
Figure 16B:
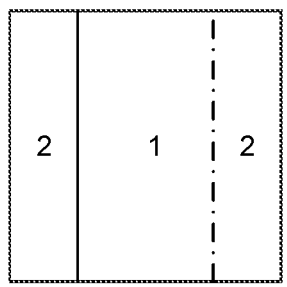
Figure 16C:
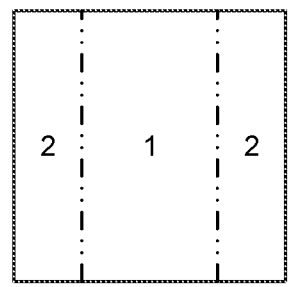

FIGS. 15A and 15B illustrate examples of relationship between split types and subdiv increments according to a first variant embodiment for AB-split. FIGS. 16A, 16B and 16C illustrate examples of values of the subdiv counter when the process is applied to the two successive asymmetric Binary splits equivalent to a Ternary-split.

Second Variant for AB-Split

FIG. 17 illustrates an example of values of the subdiv counter when the process is applied to the two successive asymmetric 1/4 binary splits in opposite directions using the first variant for AB-split. In this case, successive 1/4 AB-splits in opposite directions result in the larger part subdiv not being incremented (upper right block), despite a significantly reduced size (56% of the original surface), as shown in FIG. 17.

FIGS. 18A, 18B, 18C, 18D and 18E illustrate examples of relationship between split types and subdiv increments according to a second variant embodiment for AB-split. In this embodiment, subdiv increment are modified for all split types, as follows:

incQ=+4 for all partitions of Quad-split (FIG. 18A), incB=+2 for all partitions of Horizontal Binary split (FIG. 18B) or vertical (Not represented), incTS=+4 for side partitions of Ternary-split (which can be either vertical as shown in FIG. 18C or horizontal), and intT2=+2 for center partition, incAB1=+1 for the large part and incAB2=+4 for the small part of 1/4 AB-split, as shown in FIG. 18D for vertical 1/4 AB-split (horizontal would be similar), incAB3=+1 for the large part and incAB4=+3 for the small part of 1/3 AB-split as shown in FIG. 18E for vertical 1/3 AB-split (horizontal would be similar).

Using this variant, equivalent AB-splits and Ternary-splits still get the same subdiv, and CTB/block surface ratio is close to 2^(subdiv/2). Thus, a simple computation can be used to compute an approximation of the surface of a block: block_surface≈CTB_surface>>(subdiv/2). In the presence of Asymmetric Binary splits, partitions with the same subdiv are closer in size than with the first variant.

Impact on the Definition of Quantization Groups

A unified detection of the beginning of a quantization group (hereafter named QG start) is required for QP-delta parsing purposes and for QP prediction, as already discussed in relation with the FIG. 9. In at least one embodiment, the detection of QG start is done as follows. Two high-level syntax elements, cu_qp_delta_enabled_flag (flag enabling to activate or deactivate the usage of delta QP coding) and cu_qp_delta_subdiv (a parameter specifying the subdiv limit used to set QGs) are read from the bitstream (e.g. in PPS, slice header, tiles group header, tile header). If cu_qp_delta_enabled_flag is equal to true, the following applies.

During the split process, when subdiv<=cu_qp_delta_subdiv, a flag (CuQpDeltaCoding) is set to true to indicate QG start and current position is saved as the current QG origin. The CuQpDeltaCoding flag is reset (to false) as soon as a QP-delta is (de)coded.

However, with the introduction of new split types, QGs definition becomes non-trivial because of different-sized partitions resulting from T-splits or AB-splits. QGs cannot be defined simply as the smallest partitions with subdiv value no greater than cu_qp_delta_subdiv.

Figure 19:
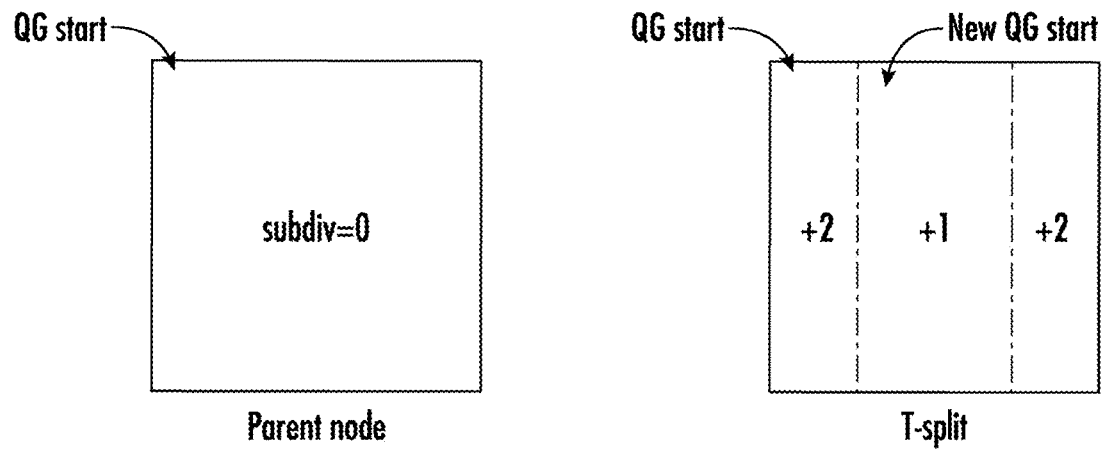
FIG. 19 illustrates an example of QG start in case of T-split.

FIG. 19 illustrates an example of QG start in case of T-split. In this example, the limit value for cu_qp_delta_subdiv is set to 1 for the sake of simplicity to illustrate the issue. Using the subdiv increments defined in FIG. 11C and assuming the parent partition had subdiv=0, a T-split results in subdiv=2 for side partitions and 1 for center partition (left side of FIG. 19). The center partition should be a QG (its subdiv is within limit: subdiv<=cu_qp_delta_subdiv) and the side partitions should not be QGs groups (as their subdiv value are larger than cu_qp_delta_subdiv), suggesting that the QG they belong to is their parent partition (or none). This would result in overlapping QGs (or having holes in QGs), which is not possible (a block shall have one single QP prediction, that is, shall belong to one and only one QG). This issue can be corrected as described hereunder.

Figure 20:
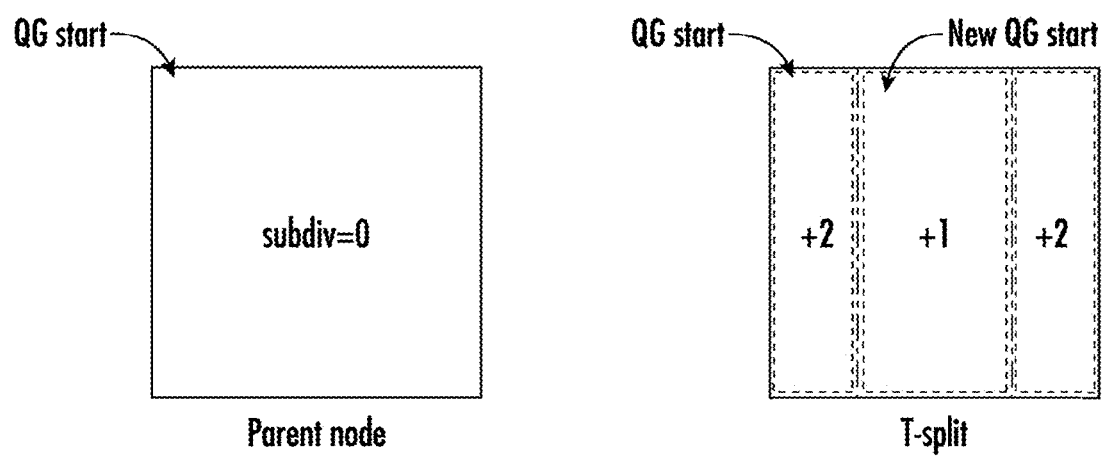
FIG. 20 illustrates an example of QG definitions in case of T-split, according to an embodiment that correct the issue of QGs.

FIG. 20 illustrates an example of QG definitions in case of T-split, according to an embodiment that correct the issue of QGs. According to this embodiment, for T-Split:
- As the first partition subdiv value is greater than cu_qp_delta_subdiv, thus QG start flag is not modified, but it was already set to true by a parent partition, with its position as QG origin.
- As for the middle partition, its subdiv value is equal to cu_qp_delta_subdiv, thus QG start flag is set to true. This starts a new QG at middle position, which means the first partition was (left) a complete QG.
- As the last partition subdiv value is greater than cu_qp_delta_subdiv, thus QG start flag is not set. This means it is a member of previous QG: middle and last partitions form a single QG.

And for AB-split:
If the smaller partition is first, there are two QGs
If the smaller partition is last, there is a single QGs
Two successive AB-splits are equivalent to a T-split.

The following sections use the syntax as described in document JVET-L1001 as an example of these syntax functions in VVC (section 7.3.4.2 specifying the function coding_tree_unit( ) section 7.3.4.3 specifying the function coding_quadtree( ), section 7.3.4.4 specifying the function multi_type_tree( ).

Figure 21:
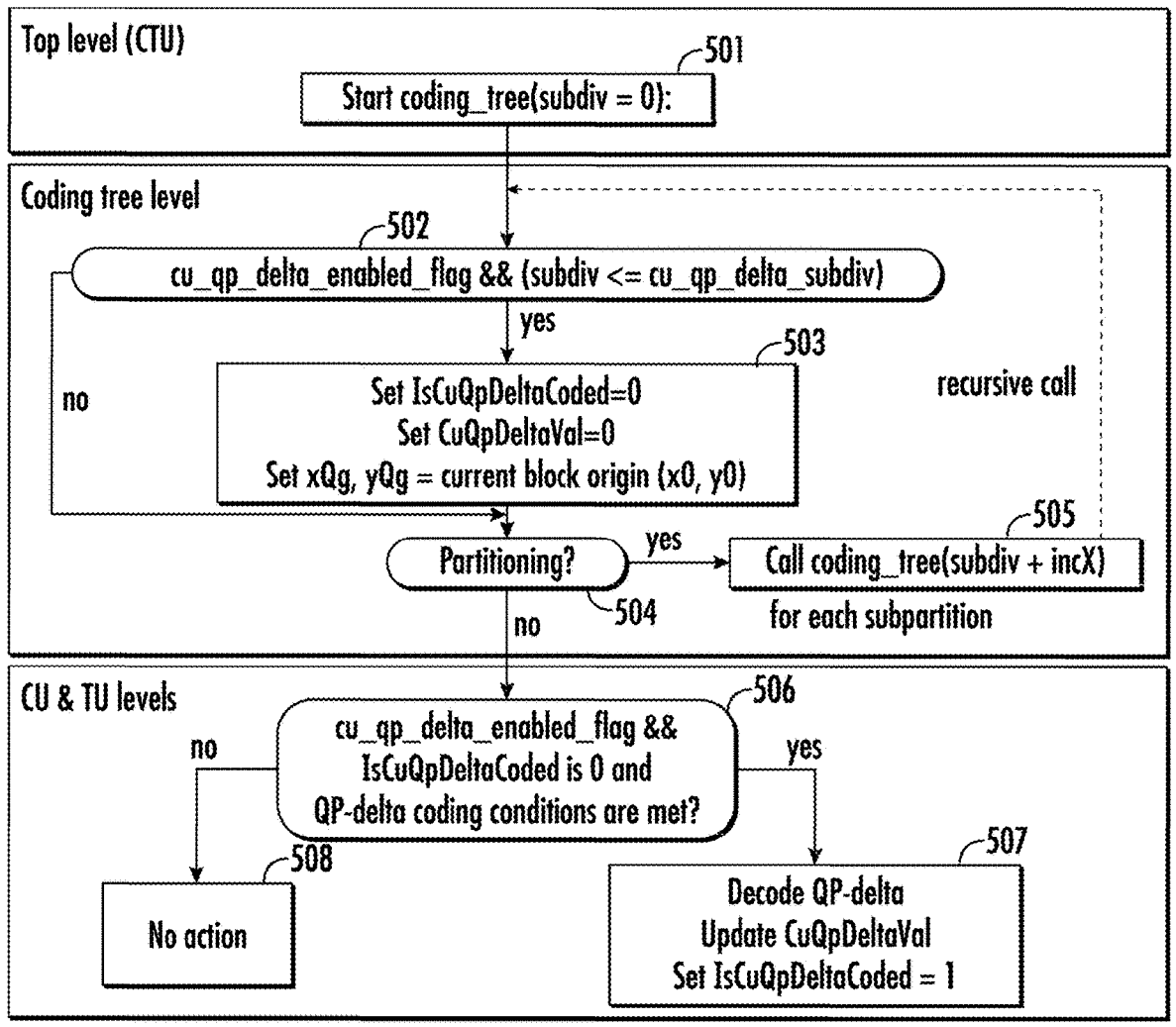
FIG. 21 illustrates a block diagram of an example embodiment of QG identification process.

FIG. 21 illustrates a block diagram of an example embodiment of QG identification process. In this embodiment a subdiv parameter is added to coding_quadtree( ) syntax and multi_type_tree( ) syntax (or equivalent syntax, collectively named coding_tree hereafter). QG detection flag is shown in the HEVC flavor, i.e. keeping IsCuQpDeltaCoded flag instead of CuQpDeltaCoding suggested above, to minimize syntax changes.

In step 501, the partitioning is launched from the CTU with 0 as subdiv parameter. At the coding tree level, in step 502, if cu_qp_delta_enabled_flag is enabled and if subdiv<=cu_qp_delta_subdiv, some values are initialized in step 503, comprising IsCuQpDeltaCoded=0, CuQpDeltaVal=0, and the current position of the block is stored as QG origin: (xQg,yQg)=(x0,y0). Step 504 checks whether sub-partitioning applies. When sub-partitioning applies, child partitioning is called in step 505 (coding_tree) with parameters according to the type of split. The subdiv parameter for each sub-partition is incremented for the corresponding sub-partition by a value incX corresponding to the type of the sub-partition according to one of the embodiments described above (for example incX is +1 for a B-split, +2 for a Q-Split, etc.). When in step 504, no more partitioning applies, meaning that coding tree leaf is reached, the process moves to the CU and TU levels. In step 506, if cu_qp_delta_enabled_flag is equal to 1 and IsCuQpDeltaCoded is equal to 0, and conditions for coding a QP-delta are met (for example: non-zero coefficients are coded=cbf is non-zero), then in step 507, QP-delta is (de)coded and CuQpDeltaVal is updated accordingly and IsCuQpDeltaCoded is set to 1. Otherwise, in step 508, no specific action is taken.

Figure 22:
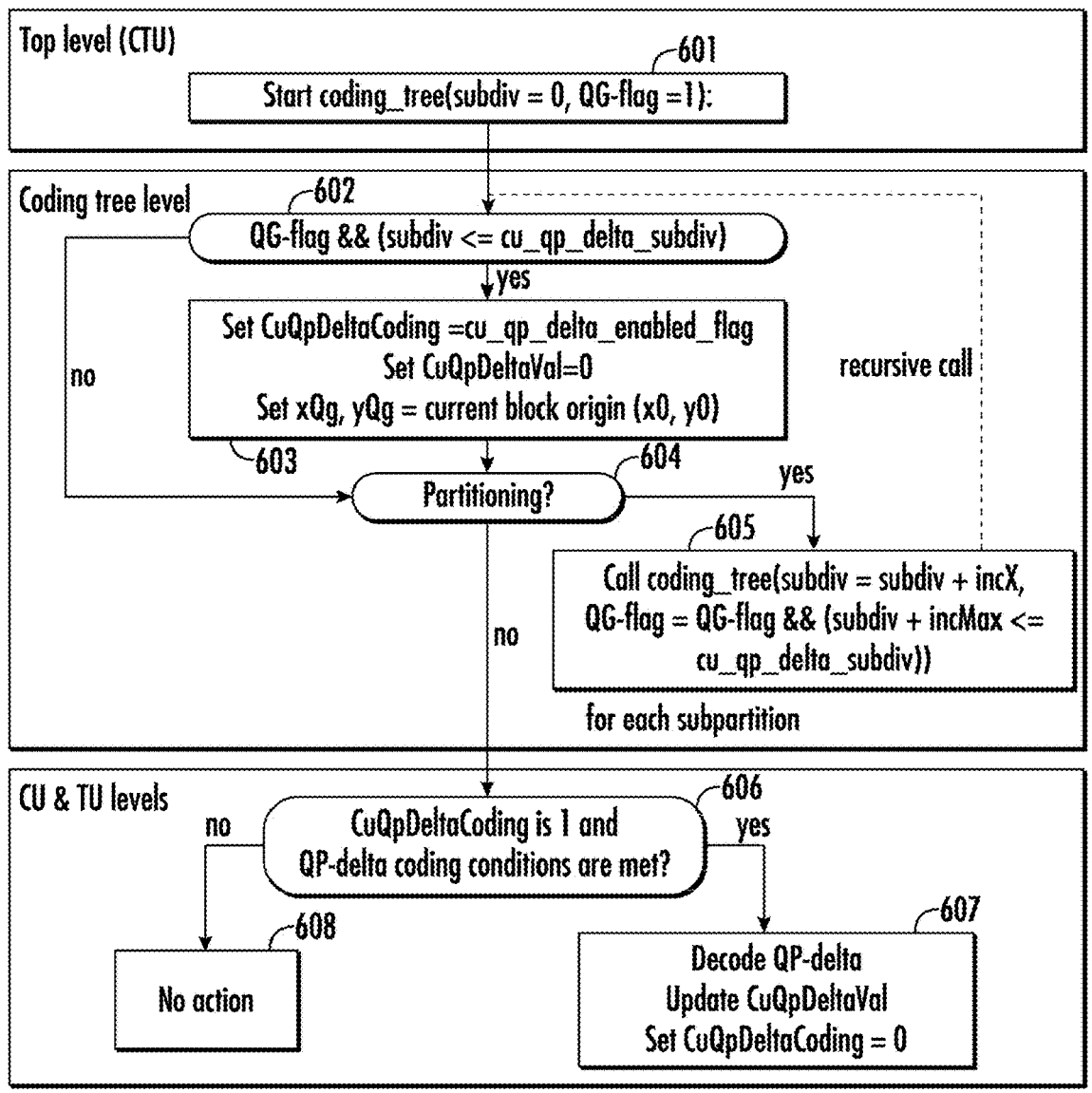
FIG. 22 illustrates a block diagram of another example embodiment of QG identification process.

FIG. 22 illustrates a block diagram of another example embodiment of QG identification process. In this embodiment, it is proposed to further restrain the creation of a new QG by adding a supplementary condition to QG start detection: the parent node disables QG start detection for all children when detecting that a child node would be above limit. This results in providing more regular QGs.

For that purpose, a QG-flag is passed as a parameter to coding_tree( ) syntax. In step 601, the partitioning is launched from the CTU with 0 as subdiv parameter and 1 as QG-flag parameter. At the coding tree level, in step 602, if QG-flag is equal to true and if subdiv<=cu_qp_delta_subdiv, some values are initialized in step 603, comprising CuQpDeltaCoding=cu_qp_delta_enabled_flag, CuQpDeltaVal=0, and the current position of the block is stored as QG origin: (xQg,yQg)=(x0,y0). Step 604 checks whether sub-partitioning applies. When sub-partitioning applies, child partitioning is called in step 605 (coding_tree) with parameters according to the type of split. The subdiv parameter for each sub-partition is incremented for the corresponding sub-partition by a value incX, X being the type of the sub-partition (for example +1 for a B-split) according to one of the embodiments described above. The QG-flag parameter is set when the next split cannot overpass the limit, so when subdiv+incMax<=cu_qp_delta_subdiv, incMax being the maximal possible increment for the considered next split. When in step 604, no more partitioning applies, meaning that coding tree leaf is reached, the process moves to the CU and TU levels. In step 606, if CuQpDeltaCoding is equal to 1, and conditions for coding a QP-delta are met (for example: non-zero coefficients are coded=cbf is non-zero), then in step 607, QP-delta is (de)coded and CuQpDeltaVal is updated accordingly and CuQpDeltaCoding is set to 0. Otherwise, in step 608, no specific action is taken.

Figure 23:
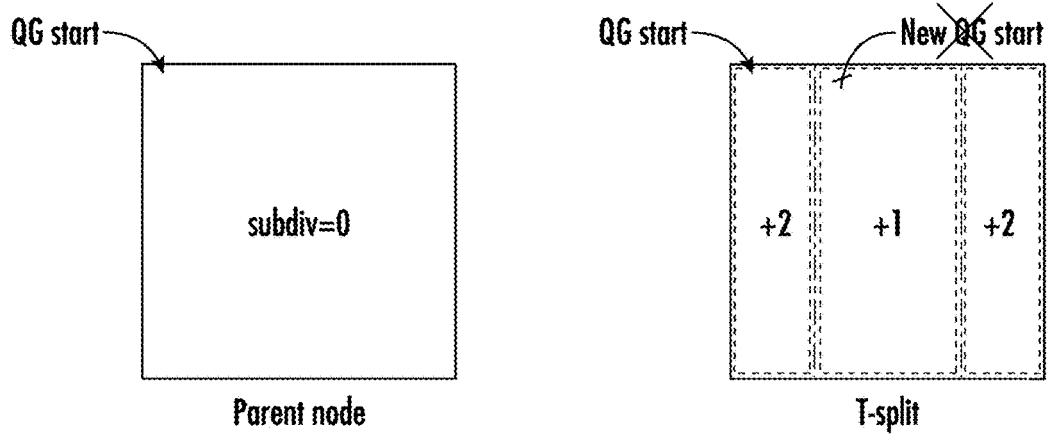
FIG. 23 illustrates the result of such embodiment in the situation of FIG. 19.

FIG. 23 illustrates the result of such embodiment in the situation of FIG. 19. At the level of the Ternary split, there is no more inconsistency between QGs thus providing a better result. In other words, it is proposed to prevent all sub-partitions of a given node from starting a new QG if any of them has a subdiv value higher than the subdiv limit. This is performed by defining a new parameter named qgEnable, passed to multi_type_tree( ) syntax function. qgEnable is initially equal to true but it is set equal to false for all children of a ternary-split when side partitions have a subdiv value higher than the subdiv limit. qgEnable is then used as an additional condition to start a new QG (and consequently saving the QG origin and allowing the QP delta coding). It is also proposed to invert the logic of IsCuQpDeltaCoded (renamed to CuQpDeltaCoding) to merge conditions and simplify the syntax.

Other coding and decoding process using quantization groups could use the same principles with the same benefits. For example, in VVC where no coding_quadtree can be found inside multi_type_tree, QG parameter use can be restricted to multi_type_tree.

Moreover, QP derivation process can be unchanged from HEVC (paragraph 8.6.1 of the HEVC specification as described in JCTVC-W1005-v4), except that xQg and yQg are given instead of being derived from current block position.

At least one embodiment uses on-the-fly CU QP derivation made possible by adding a CuQpPredict internal flag, set to 1 when detecting a QG start (e.g. when CuQpDeltaCoding is equal to 1; xQg, yQg and CuQpDeltaVal variables are not needed and can be removed); in CU, if CuQpPredict is set, predict QP, assign it to QpY variable, and reset CuQpPredict flag. Inside TU, when CuQpDeltaCoding is 1 and QP-delta is present, QpY is incremented by the value of the decoded delta and CuQpDeltaCoding is reset.

Syntax Elements & Semantics

In at least one embodiment, the subdiv process is implemented by using a specific syntax signaling the value of subdiv level counter. Coded syntax elements described hereafter is based on HEVC or VVC (see [JVET_K1001]) where changes are highlighted on grey background color.

In a first change, diff_cu_qp_delta_depth is renamed into cu_qp_delta_subdiv and semantics description is adapted accordingly. The derived variable Log 2MinCuQpDeltaSize is removed.

FIG. 24 illustrates a table representing an example of syntax for picture parameter set (PPS) according to an embodiment using a subdivision level counter. In this table:
   cu_qp_delta_enabled_flag equal to 1 specifies that the cu_qp_delta_subdiv syntax element is present in the PPS and that cu_qp_delta_abs may be present in the transform unit syntax. cu_qp_delta enabled_flag equal to 0 specifies that the cu_qp_delta_subdiv syntax element is not present in the PPS and that cu_qp_delta_abs is not present in the transform unit syntax.
   cu_qp_delta_subdiv specifies the maximum cbSubdiv value of coding units that convey cu_qp_delta_abs and cu_qp_delta_sign_flag. When not present, the value of cu_qp_delta_subdiv is inferred to be equal to 0.

Syntax Elements & Semantics for Main Embodiment

FIGS. 25 to 28B illustrate tables representing example of syntax for implementing the main embodiment. The syntax is shown with regards to VVC syntax and amendments are highlighted on grey background color. For the sake of notation consistency with the other parameters, the subdiv level counter is represented by the cbSubdiv parameter. SPLIT_BT_HOR, SPLIT_BT_VER, SPLIT_TT_HOR and SPLIT_TT_VER respectively corresponds to horizontal B-split, vertical B-split, horizontal T-split and vertical T-split. The condition used in coding tree syntax to reset IsCuQpDeltaCoded and CuQpDeltaVal is modified from (cu_qp_delta_enabled_flag && log 2CbSize>=Log 2MinCuQpDeltaSize) to (cu_qp_delta_enabled_flag && cbSubdiv<=cu_qp_delta_subdiv). Under this condition, in addition to resetting IsCuQpDeltaCoded and CuQpDeltaVal, x0 and y0 are saved to xQg and yQg (step 503 of FIG. 21 and 603 of FIG. 22). Syntax or semantics is added to coding quadtree( ) and multi_type_tree( ) (and also dual_tree_implicit_qt_split) to increment the newly created cbSubdiv parameter according to split type and partition index, as described in the main embodiment or the variants of the main embodiments (if AB-split is required).

In the paragraph "derivation process for quantization parameters" of VVC, the location of QG origin (xQg, yQg) cannot be derived as described in HEVC, because it was based on Log 2MinCuQpDeltaSize but (xQg, yQg) are directly the one saved in coding_quadtree( ) and multi_type_tree( ).

Syntax Elements & Semantics for Main Embodiment with Restricted Detection of QG Start In at least one embodiment, the subdiv process is implemented by using a specific syntax signaling the value of subdiv level counter and at least a parameter related to quantization group start detection. Thus, the detection of QG start is done by adding the QG-flag parameter (renamed in the following tables as "QG") and modifying QG start detection condition in coding tree syntax. Amendments are highlighted on grey background color.

FIGS. 29 to 31 illustrate tables representing example of syntax for implementing the main embodiment and handling the QG start detection. The syntax is shown with regards to VVC syntax and amendments are highlighted on grey background color. The same syntax as in coding_quadtree( ) is used for dual_tree_implicit_qt_split( ) and is not shown here.

FIGS. 32 to 35 illustrate tables representing example of syntax for implementing the main embodiment and handling the QG start detection for chroma related elements (indicated in bold italic text in the tables). Indeed, although the description above has been done in the context of luma quantization parameters, the same principles apply mutatis mutandis to chroma quantization.

The person skilled in the art will understand that the syntax structures and element names may exist in multiple variations depending on the version of the standard. Syntax elements may be replaced by variables that represent the same information. For example, a former version of VVC used cu_qp_delta_subdiv syntax element present in PPS while a further version of VVC uses a CuQpDeltaSubdiv variable defined in the slice header semantics that represents the same information but that selects an appropriate value for the current slice type based on syntax elements present in the picture header. In addition, some changes exist in different versions of VVC regarding the coding tree syntax structures. These changes do not impact the principle of the embodiments described above. In addition, the syntax relevant to these embodiments may be included at different places in different structures.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the processes presented in FIGS. 12, 21 and 22.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the process of FIGS. 12, 21 and 22.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types.

The invention claimed is:

1. A method comprising:
   determining that a block of an image has been partitioned into sub-blocks;
   for each sub-block, associating a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split
   based on the subdivision level counter, determining a quantization parameter for the sub-block; and
   decoding the sub-block based on the determined quantization parameter.

2. The method of claim 1, further comprising, enabling a new quantization group according to the type of split while the subdivision level counter of a sub-block is smaller than or equal to a maximal value of subdivision.

3. The method of claim 2, further comprising, when a new quantization group is enabled, storing a position of the block.

4. The method of claim 1, further comprising, disabling new quantization groups when a block of an image is partitioned into sub-blocks according to ternary split and when the subdivision level counter of the smallest sub-block is greater than a maximal value of subdivision.

5. The method of claim 1, wherein the decoding the sub-block based on the determined quantization parameter applies to luma components or to chroma components.

6. A method comprising:
   determining that a block of an image has been partitioned into sub-blocks;
   for each sub-block, associating a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split;
   based on the subdivision level counter, determining a quantization parameter for the sub-block; and
   encoding the sub-block based on the determined quantization parameter.

7. A device comprising an encoder configured to:
   determine that a block of an image has been partitioned into sub-blocks;
   for each sub-block, associate a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split;
   based on the subdivision level counter, determine a quantization parameter for the sub-block; and
   encode the sub-block based on the determined quantization parameter.

8. A device comprising a decoder configured to:
   determine that a block of an image has been partitioned into sub-blocks;
   for each sub-block, associate a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split;
   based on the subdivision level counter, determine a quantization parameter for the sub-block; and
   decode the sub-block based on the determined quantization parameter.

9. A non-transitory computer readable medium comprising program code instructions which, when executed by a processor enables the device to implement a method comprising:
   determining that a block of an image has been partitioned into sub-blocks;
   for each sub-block, associating a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split;
   based on the subdivision level counter, determining a quantization parameter for the sub-block; and
   decoding the sub-block based on the determined quantization parameter.

10. A non-transitory computer readable medium comprising program code instructions which, when executed by a processor enables the device to implement a method comprising:
    determining a block of an image has been partitioned into sub-blocks;
    for each sub-block, associating a subdivision level counter to the sub-block, wherein the subdivision level counter is representative of a size of the sub-block and has an increment value selected from a plurality of increment values based on the type of split of the partitioning into sub-blocks, and wherein the increment value is equal to two for all sub-blocks of a quad-split, one for all sub-blocks of binary split, two for side sub-blocks of ternary-split, and one for a center sub-block of a ternary-split;
    based on the subdivision level counter, determining a quantization parameter for the sub-block; and
    encoding the sub-block based on the determined quantization parameter.

11. The method of claim 6, further comprising enabling a new quantization group according to the type of split while the subdivision level counter of a sub-block is smaller than or equal to a maximal value of subdivision.

12. The method of claim 11, further comprising, when a new quantization group is enabled, storing a position of the block.

13. The method of claim 6, further comprising disabling new quantization groups when a block of an image is partitioned into sub-blocks according to ternary split and when the subdivision level counter of the smallest sub-block is greater than a maximal value of subdivision.

14. The method of claim 6, wherein the encoding the sub-block based on the determined quantization parameter applies to luma components or to chroma components.

15. The device of claim 7, wherein the encoder is further configured to enable a new quantization group according to the type of split while the subdivision level counter of a sub-block is smaller than or equal to a maximal value of subdivision.

16. The device of claim 7, wherein the encoder is further configured to disable new quantization groups when a block of an image is partitioned into sub-blocks according to ternary split and when the subdivision level counter of the smallest sub-block is greater than a maximal value of subdivision.

17. The device of claim 8, wherein the decoder is further configured to enable a new quantization group according to the type of split while the subdivision level counter of a sub-block is smaller than or equal to a maximal value of subdivision.

18. The device of claim 17, wherein the decoder is further configured to, when a new quantization group is enabled, store a position of the block.

19. The device of claim 8, wherein the decoder is further configured to disable new quantization groups when a block of an image is partitioned into sub-blocks according to ternary split and when the subdivision level counter of the smallest sub-block is greater than a maximal value of subdivision.

20. The device of claim 8, wherein decoding the sub-block based on the determined quantization parameter applies to luma components or to chroma components.

* * * * *